United States Patent
Toline et al.

(10) Patent No.: US 8,708,632 B2
(45) Date of Patent: Apr. 29, 2014

(54) ACTIVE CHOKING FUNNEL FOR A GRAIN SPREADER

(75) Inventors: Travis Toline, Wahoo, NE (US); Riley N. Smith, Omaha, NE (US)

(73) Assignee: Global Industries, Inc., Grand Island, NE (US)

( * ) Notice: Subject to any disclaimer, the term of this patent is extended or adjusted under 35 U.S.C. 154(b) by 535 days.

(21) Appl. No.: 13/048,529

(22) Filed: Mar. 15, 2011

(65) Prior Publication Data

US 2012/0237322 A1  Sep. 20, 2012

(51) Int. Cl.
*B65G 69/04* (2006.01)

(52) U.S. Cl.
USPC .......................................... 414/299; 414/300

(58) Field of Classification Search
USPC ...................... 414/193, 195, 208, 299–301
See application file for complete search history.

(56) References Cited

U.S. PATENT DOCUMENTS

| 2,665,015 | A | * | 1/1954 | Best ............................... 414/294 |
| 2,692,702 | A | * | 10/1954 | Church ............................. 222/1 |
| 2,758,699 | A | * | 8/1956 | Magnuson ..................... 198/530 |
| 3,045,840 | A | * | 7/1962 | Donelson, Jr. ................ 414/301 |
| 3,563,476 | A | * | 2/1971 | Donelson, Jr. ................ 239/668 |
| 4,902,185 | A |   | 2/1990 | Dixon et al. |
| 6,991,415 | B1 |  | 1/2006 | Anschultz |
| 8,123,452 | B2 | * | 2/2012 | Sukup .......................... 414/301 |
| 2008/0101897 | A1 | | 5/2008 | Sukup |

* cited by examiner

Primary Examiner — Joseph C Rodriguez
(74) Attorney, Agent, or Firm — Polsinelli PC

(57) ABSTRACT

A grain spreader with an active choking funnel is described. The grain spreader includes an upper funnel assembly to receive grain. A choking funnel assembly is in a spring loaded engagement with the upper funnel assembly. The upper funnel assembly directs the grain to the choking funnel assembly. A spreader pan or a grain distributor is positioned beneath the choking funnel assembly. The choking funnel assembly spreads the grain on the spreader pan or the grain distributor.

17 Claims, 5 Drawing Sheets

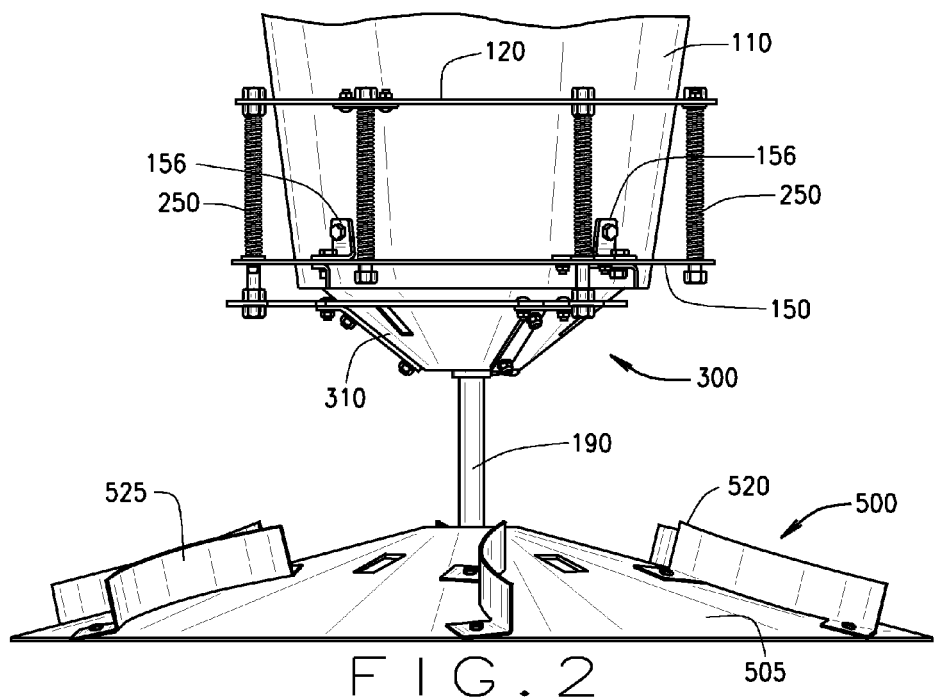
F I G. 2
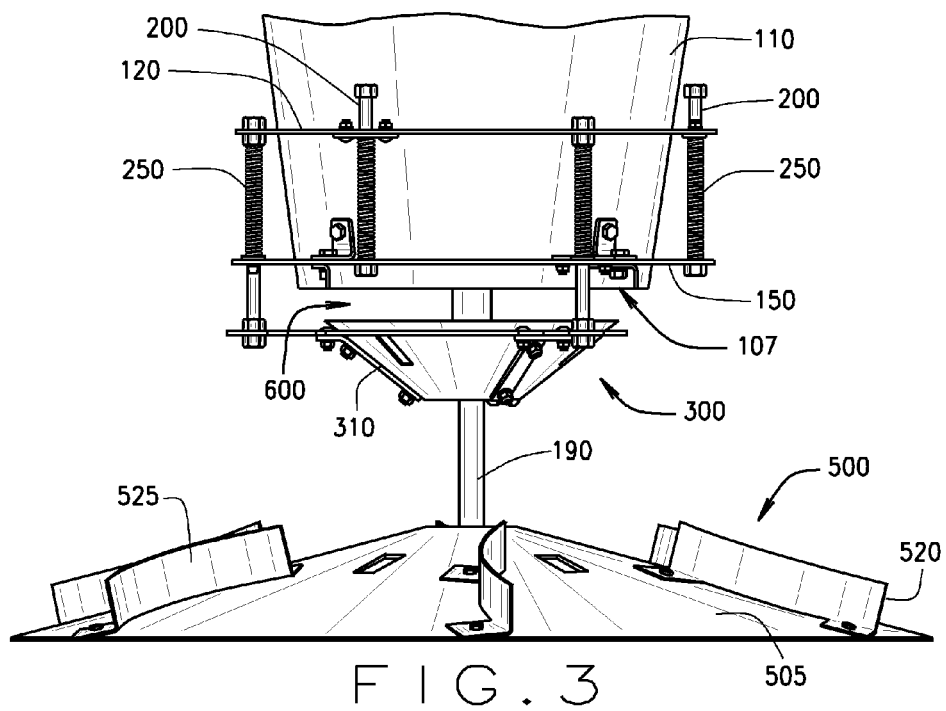
F I G. 3

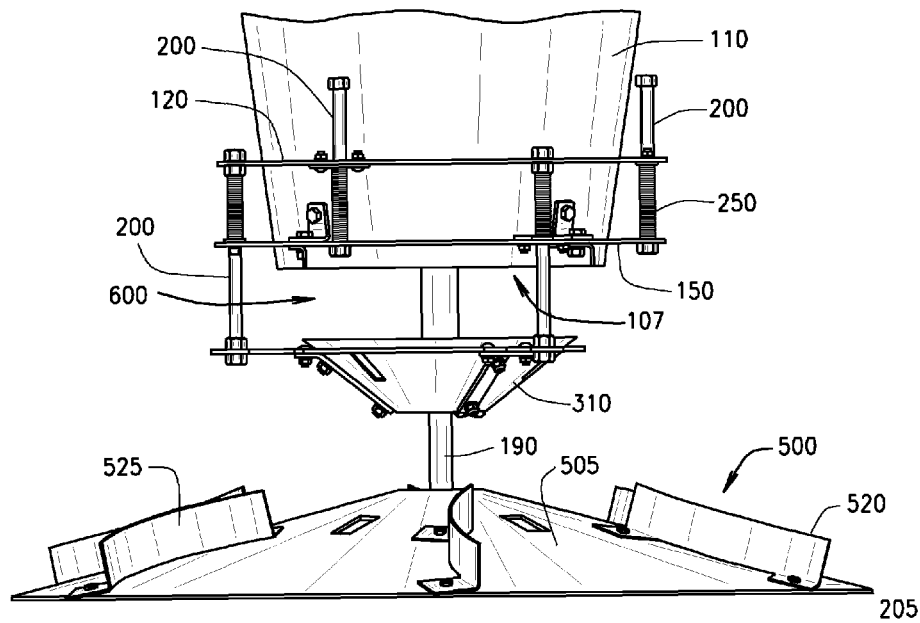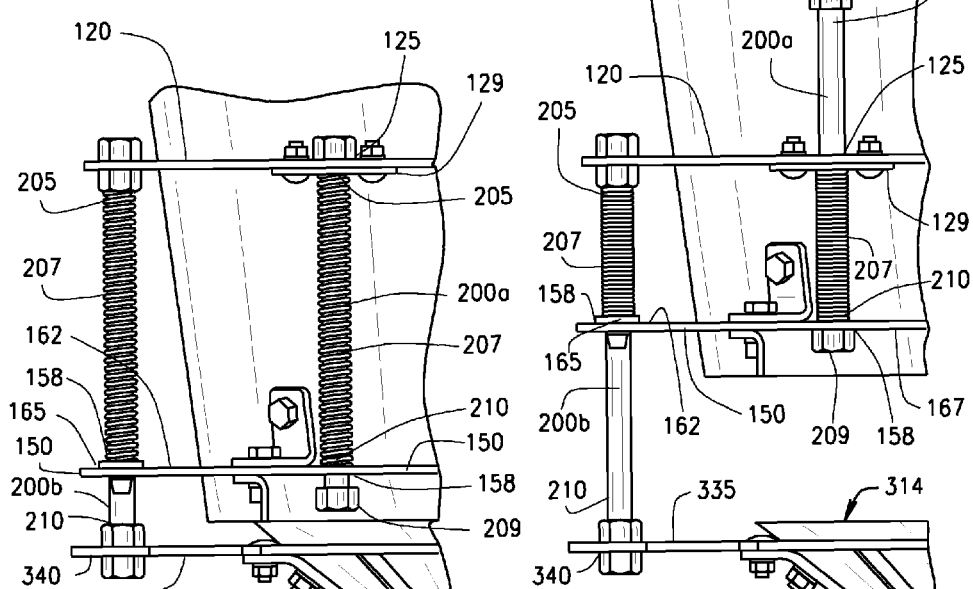

ACTIVE CHOKING FUNNEL FOR A GRAIN SPREADER

FIELD OF INVENTION

The present invention relates to an active choking funnel for a grain spreader.

BACKGROUND OF INVENTION

Grain bins are typically used to store and dry grain. Grain spreaders are mounted at a top of the grain bin to receive the incoming grain. As the grain bins may be many feet in height, the grain spreaders are used to evenly fill the grain bin. The grain spreaders include a rotating pan to spread the grain in the grain bin to promote even spreading of the grain in the grain bin such that the grain evenly dries. Conventional spreaders may leave pockets in the grain bin or create an uneven distribution of the different components of the grain. This may be caused by fluctuations in a delivery rate of the grain to the conventional grain spreader.

Other grain spreaders attempt to overcome these problems by positioning static diverters or structures within a hopper of the grain spreader. However, these static diverters or structures often do not capture all of the grain loaded into the hopper, and the grain may still fill the grain bin in an uneven matter. Further, these static diverters and structures do not respond to fluctuations in grain in-flow rates. Other grain spreaders use vanes in a lower opening of the hopper. However, these vanes require manual adjustment when the grain in-flow rates vary. Other gravity-based grain spreaders use deflectors below the hopper to spread the grain. However, these gravity grain spreaders are relatively large and may interfere with auxiliary equipment placed in the grain bin.

SUMMARY INVENTION

An active choking funnel for a grain spreader is described. The active choking funnel centers and/or controls the flow of grain before the grain comes in contact with a spreading pan or a grain distributor. The active choking funnel centers the flow of grain on to the spreading pan or the grain distributor. The spreading pan rotates to evenly distribute the grain in a grain bin.

This centering action is important since it improves the quality of the spread of the grain in the grain bin. The quality of the spread is defined as the variation in grain depth measured both radially and circumferentially around the grain bin, as well as the amount of damage incurred to the grain during the spreading process. Optimal spread quality is important, as the main function of the grain spreader is to evenly spread the grain (and the fines in the grain) around the grain bin to ensure even drying when aeration and/or heat is added to the grain bin. The active choking funnel improves the performance of the grain spreader by centering the grain flow onto the spreader pan or the grain distributor, and, thus, the quality of the spread of the grain in the grain bin is improved.

The active choking funnel is placed between an upper funnel of the grain spreader and the spreader pan or the grain distributor. An upper opening of the active choking funnel receives the grain from the upper funnel. The upper opening is formed by a wide side of the active choking funnel. This active choking funnel actively responds to variations in in-flow capacity by utilizing spring loaded leveling systems. By actively responding to varying in-flow conditions, the choking funnel ensures an even circumferential flow of grain onto the spreading pan or the grain distributor, which results in increased spread quality.

Furthermore, minimal grain damage during the spreading process is imperative due to penalties paid on damaged grain when the grain is taken to market. The orientation of the active choking funnel under the upper funnel also causes the flow of the grain to be "grain on grain," as opposed to grain on another surface, such as metal. Grain on grain flow is desirable because this type of flow minimizes the amount of grain that is damaged during the spreading process. On the contrary, grain on metal contact may damage the grain.

The active choking funnel ensures the even flow of grain onto the spreading pan. The active choking funnel responds to variations of the in-flow of grain and "backs up" the flow of grain to ensure even flow. This "back-up" of grain also creates grain on grain flow in the choking mechanism.

The combination of the choking mechanism and the size of the upper receiving funnel allow this grain spreader to work with a wide range of varying in-flow capacities. Further, the increased sized of the upper funnel allows for the spreader to be more responsive to surges in in-flow capacity.

In one aspect, a grain spreader with an active choking funnel is described. The grain spreader includes an upper funnel assembly to receive grain. The grain spreader further includes a choking funnel assembly in a spring loaded engagement with the upper funnel assembly. The upper funnel assembly directs the grain to an upper opening of the choking funnel assembly. The grain spreader further includes a spreader pan or a grain distributor. The choking funnel assembly spreads the grain on the spreader pan or the grain distributor.

In another aspect, a grain spreader with an active choking funnel is described. The grain spreader includes an upper funnel assembly defining a top opening, a bottom opening, and an interior to receive grain. The grain spreader further includes a choking funnel assembly that opens and closes in response to a flow of grain from the upper funnel assembly. The choking funnel assembly includes a choking funnel and a choking funnel mount. A guide ring is positioned about the upper funnel in a moving engagement. A fixed ring is positioned about the upper funnel in a stationary engagement. A plurality of spring loaded rods connect the choking funnel assembly and the upper funnel assembly. A spreader pan is rotatably engaged to the upper funnel assembly.

In another aspect, an active choking funnel for a grain spreader is described. The active choking funnel includes a funnel with sidewalls. The funnel defines an upper opening. The funnel defines a central opening to receive a motor shaft. The funnel is engaged to a choking funnel mount. A plurality of spring loaded rods are engaged to the choking funnel mount.

In another aspect, a method for spreading grain in a grain bin is described. The method includes providing a grain spreader with an active choking funnel. The grain spreader includes an upper funnel assembly having an upper funnel to receive grain. A choking funnel assembly is in a spring loaded engagement with the upper funnel assembly. The upper funnel assembly directs the grain to the choking funnel assembly. The choking funnel assembly spreads the grain on a spreader pan or on a grain distributor. The method further includes positioning the grain spreader in a grain bin. The method further includes directing the grain into an upper opening of the upper funnel. The method further includes directing the grain to the choking funnel assembly. The method further includes causing the choking funnel assembly to lower. The method further includes directing the grain to the spreader pan or the grain distributor.

BRIEF DESCRIPTION OF DRAWINGS

FIG. 2 is a front view of the grain spreader with the active choking funnel in the closed position.

FIG. 3 is a front view of the grain spreader with the active choking funnel in the partially open position.

FIG. 4 is a front view of the grain spreader with the active choking funnel in the fully open position.

FIG. 5 is a close-up view of the rods when the choking funnel is closed.

FIG. 6 is close-up view of the rods when the choking funnel is open.

DETAILED DESCRIPTION OF INVENTION

Figure 1:
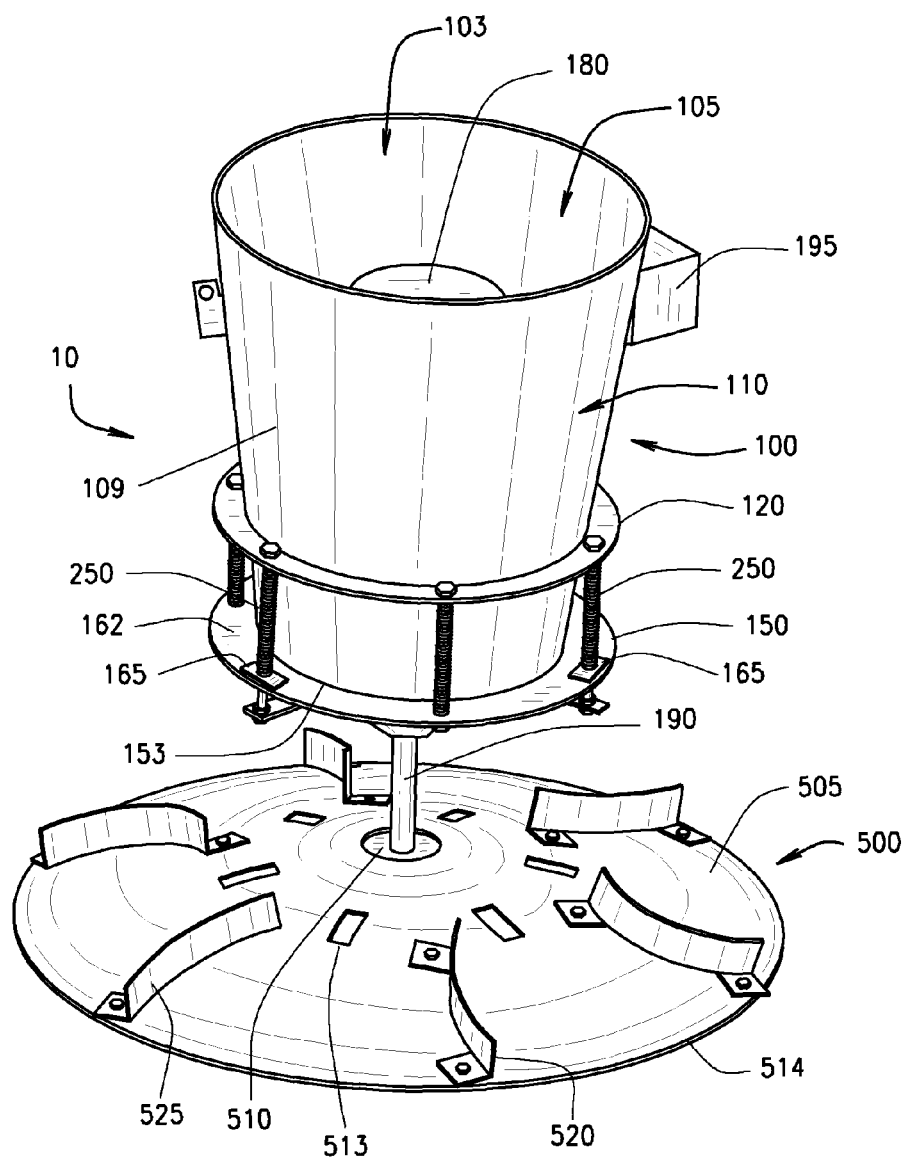
FIG. 1 is a perspective view of the grain spreader with the active choking funnel.
Figure 7:
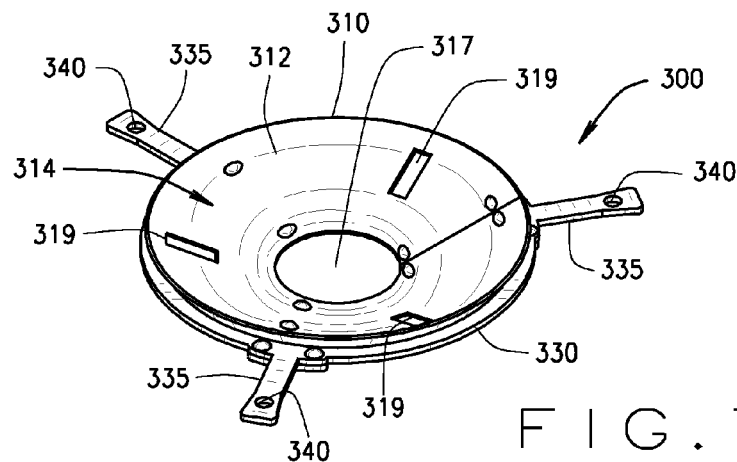
FIG. 7 is a perspective view of the choking funnel assembly.
Figure 8:
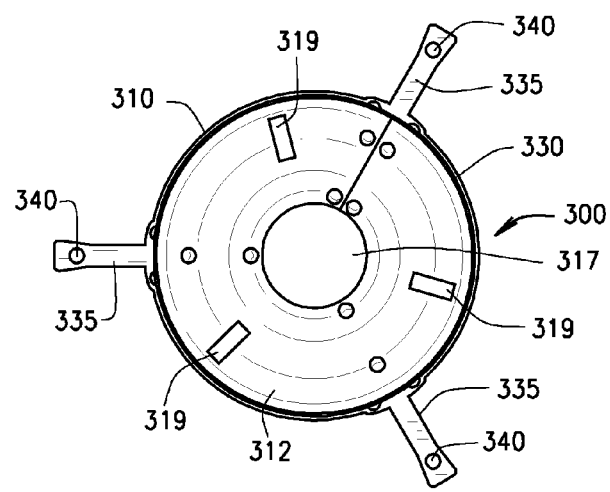
FIG. 8 is a top view of the choking funnel assembly.
Figure 9:
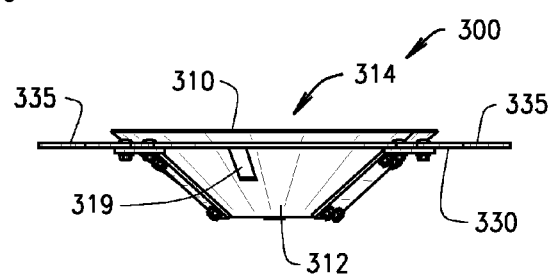
FIG. 9 is a side view of the choking funnel assembly.

An active choking funnel for a grain spreader is described. The grain spreader controls and centers the flow of grain before the grain comes in contact with a spreading pan or other grain distributor. Centering the grain onto the spreading pan or the grain distributor helps to distribute the grain evenly in a grain bin. The grain may contain different components of heavier weight and fine portions that may gravitate toward the middle or side of the grain bin. The grain spreader levels off the grain so it is evenly distributed throughout the column of the grain in the grain bin. This allows air to circulate and dry the grain in an efficient manner.

The grain spreader includes the active choking funnel that opens and closes depending upon the flow of the grain to the grain spreader. The grain may be loaded into the grain spreader via an auger, conveyor, pump, or other agricultural implement or machine. As the grain enters the grain spreader, the choking funnel opens in response to the weight and flow rate of the grain entering the grain spreader. The active choking funnel descends or lowers from the grain spreader to allow grain to pass to the spreader pan or the grain distributor.

The grain spreader includes an upper funnel assembly to receive the grain. The grain spreader further includes a choking funnel assembly in a spring loaded engagement with the upper funnel assembly. The upper funnel assembly directs the grain to the choking funnel assembly. The grain spreader further includes the spreader pan or the grain distributor. The choking funnel assembly spreads the grain on the spreader pan or the grain distributor. The spreader pan may be engaged to a motor that cause the spreader pan to rotate and spread the grain that contacts the spreader pan.

The upper funnel assembly is positioned above the choking funnel assembly. The weight of the grain causes the choking funnel assembly to lower from the upper funnel to open a bottom opening of a funnel of the upper funnel assembly. The grain continues to pour out of the upper funnel assembly through the bottom opening and onto the choking funnel assembly. The grain already in the choking funnel assembly cushions the grain entering the choking funnel assembly and provides "grain to grain" contact. The grain in the choking funnel assembly may back-up or slow the emptying of the upper funnel assembly, which improves the grain spreading in the bin and also cushions the grain.

The choking funnel directs the grain to the spreader pan or other grain distributor. The spreader pan may rotate via a motor. The spreader pan may also operate without a motor, as certain spreader pans rotate via the weight of the grain. The grain distributor may includes chutes, tubes, spreading legs, diverters, etc. that are commonly used with grain spreaders in order to spread grain in a grain bin.

The upper funnel assembly and the choking funnel assembly are engaged together by spring loaded rods. The grain entering the choking funnel assembly overcomes the force of the spring loaded rods to cause the choking funnel assembly to lower or descend and to open the bottom opening of the upper funnel assembly.

The active choking funnel accommodated fluctuations in delivery rates to the grain spreader to maintain an even spreading of the grain in the grain bin. When the delivery of grain to the grain spreader slows, the choking funnel actively responds and begins to close the bottom opening as the choking funnel rises toward the bottom opening. When the delivery of grain to the grain spreader stops, the choking funnel actively responds and closes or nearly closes the bottom opening.

The active choking funnel improves the performance of the grain spreader by centering the grain flow onto the spreader pan or the grain distributor, and, thus, the quality of the spread of the grain in the grain bin is improved. The grain flow is generally forced over the outside perimeter of the choking funnel, which evenly distributes the grain onto the spreader pan or the grain distributor.

The active choking funnel for the grain spreader will now be described with reference to the FIGS. An active choking funnel for a grain spreader 10 is shown in FIGS. 1-10. The grain spreader 10 generally includes an upper funnel assembly 100, a choking funnel assembly 300, and a spreader pan 500. The upper funnel assembly 100 receives grain from an auger or other grain moving implement. The upper funnel assembly 100 directs the grain into the choking funnel assembly 300, which further directs the grain onto the spreading pan 500. The choking funnel assembly 300 is in a spring loaded engagement with the upper funnel assembly 100 such that the choking funnel assembly 300 descends or lowers from the upper funnel assembly 100 in response to the weight and flow rate of the grain.

The upper funnel assembly 100 will now be described with reference to FIG. 2, which shows a static or a closed position of the grain spreader 10. The upper funnel assembly 100 includes an upper funnel 110. The upper funnel 110 has a top opening 103 that receives the grain and a bottom opening 107 that allows the grain to flow to the choking funnel assembly 300. The top opening 103 opens to an interior 105 that receives the grain from the auger or other grain transferring implement.

The upper funnel 110 includes sidewalls 109 that slope inwardly in a conical shape toward the bottom opening 107. The top opening 103 is generally larger in diameter than the bottom opening 107. The sidewalls 109 may be made from a sheet metal, other rigid metal, metal alloy, or plastic.

A lower portion of the upper funnel 110 includes a fixed ring 150. An inner diameter 153 of the fixed ring 150 receives the upper funnel 110. The fixed ring 150 is fixedly connected to the upper funnel 110 via brackets 156. The fixed ring 150 remains stationary and fixed relative to the upper funnel 110. The fixed ring 150 includes a plurality of openings 158 that receive rods 200, which direct and/or control the movement of the choking funnel assembly 300. The fixed ring 150 further includes an upper surface 162 and a lower surface 167. The upper surface 162 includes rod guides 165 that direct and control the movement of rods 200 through the openings 158.

The upper funnel assembly 100 further includes a guide ring 120. The guide ring 120 moves relative to the upper funnel 110 as the choking funnel assembly 300 moves to and from open and closed positions. An inner diameter 123 of the guide ring 120 receives the upper funnel 110. The inner diameter 123 is larger than an outer diameter of a lower portion of the upper funnel 110, such that the guide ring 120 may descend in a direction toward the bottom opening 107 of the upper funnel 100. The guide ring 120 further includes a plurality of openings 125 that receive the rods 200. The guide ring 120 further includes a lower surface 127 and an upper surface 128. The lower surface 127 includes rod guides 129. The rods 200 connect the choking funnel assembly 300 to the upper funnel assembly 100 in a spring loaded engagement that actively responds to the weight and flow rates of the grain in the grain spreader 10.

The choking funnel assembly 300 will now be described with reference to FIGS. 7-10. The choking funnel assembly 300 includes a choking funnel 310 with sidewalls 312. The choking funnel 310 includes an upper opening 314, which is formed by the conical shape of the choking funnel 310. The choking funnel 310 forms a conical shape to catch the grain received from the upper funnel 110.

The choking funnel 310 includes the sidewalls 312 that define a central opening 317. The central opening 317 allows a shaft 190 from a motor 180 to pass through the choking funnel 310 and to engage the spreader pan 500. Some grain may also pass through the central opening 317 to areas on the spreader pan 500 or other grain distributor below the central opening 317. The sidewalls 312 taper inward from the upper opening 314 to the central opening 317. The upper opening 314 is on a wider side of the choking funnel 310, i.e., a "point" portion of the choking funnel 310 is facing downwards. As such, the upper opening 314 is facing upward toward the bottom opening 107 of the upper funnel 110. The choking funnel 310 further includes perimeter openings 319 that are provided around the central opening 317 in the sidewalls 312. The perimeter openings 319 allow some grain to pass directly through the sidewalls 312 and to areas below the perimeter openings 319.

Figure 10:
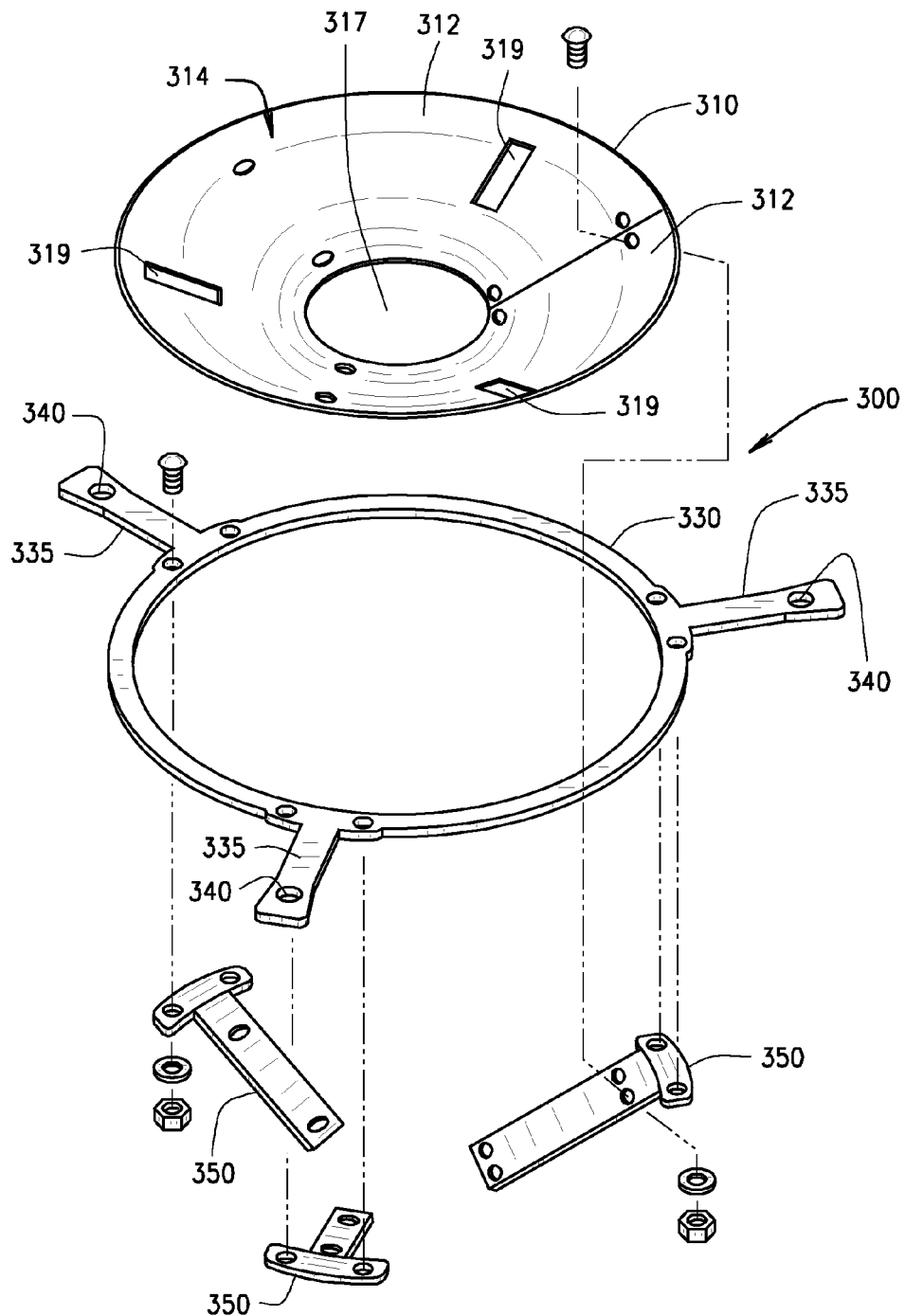
FIG. 10 is an exploded view of the choking funnel assembly.

The sidewalls 312 have an upper surface 315 that receives the grain. The choking funnel 310 is mounted to a choking funnel mount 330. The choking funnel mount 330 includes arms 335 defining openings 340 that receive the rods 200. As shown in FIG. 10, choking funnel tabs 350 secure the choking funnel 310 to the choking funnel mount 330.

The upper funnel assembly 100 includes the upper funnel 110 having a conical shape with the top opening 103 and the bottom opening 107. The bottom opening 107 is smaller in diameter than the top opening 103. The choking funnel assembly 300 also has a conical shape with the upper opening 314. The upper opening 314 of the choking funnel 310 is facing upward toward the bottom opening 107 of the upper funnel 110. As such, both of the upper funnel 110 and the choking funnel 310 have a conical shape. The upper funnel 110 is positioned over the choking funnel 310 with the narrower bottom opening 107 directing the grain into the upper opening 314 of the choking funnel 310. As such, the grain from the upper funnel 110 is directed onto the upper surface 315 of the choking funnel 310. The sidewalls 312 and upper surface 315 of the choking funnel 310 form a concave or cup-like structure to catch or receive the grain until the amount of grain overflows the choking funnel 310.

The spreader pan 500 will now be described with reference to FIG. 1. The spreader pan 500 includes an upper surface 505 that defines a central opening 510 and peripheral openings 513. The shaft 190 passes through the central opening 510 to fasten to the spreader pan 500. The peripheral openings 513 allow a certain amount of grain to pass directly through the spreader pan 500 to further promote even layering and spreading of the grain. An outer edge 514 circumscribes the spreader pan 500. The upper surface 505 of the spreader pan includes a plurality of paddles 520 that physically direct or push the grain. The paddles 520 include a concave shape and an inner-surface 525.

As grain enters the upper funnel assembly 100 and passes to the choking funnel assembly 300, a gap 600 is formed between the bottom opening 107 of the upper funnel 110 and the upper opening 314 of the now lowering choking funnel 310. The weight of the grain entering the upper funnel assembly 100 overcomes the force of the spring loaded rods 200 to cause the choking funnel assembly 300 to lower or descend to form the gap 600. When the flow of grain into the upper funnel assembly stops or slows, the choking funnel assembly 300 may ascend or rise to close the bottom opening 107 of the upper funnel 110.

The grain passes through the bottom opening 107 of the upper funnel 110 and hits the upper surface 314 of the choking funnel 310 and falls to the spreader pan 500, which is rotating. The upper funnel 110 includes the motor 180. The motor 180 is mechanically engaged to the shaft 190, which is rotating the spreader pan 500. One suitable motor for the motor 180 is a 3HP TENV (Totally Enclosed Non-ventilated) 230/460V 3 Phase type of motor. The motor size may be scaled up or down depending upon the application of the grain spreader 10. A junction box 195 is in control and electrical communication with the motor 180. In other aspects, the spreader pan 500 may not have a motor, as the spreader pan 500 may rotate via the weight of the grain contacting the spreader pan 500.

As the grain enters the upper funnel 110 and passes to the choking funnel 310, the gap 600 increases. Grain passes to the choking funnel 310 through the gap 600 and onto the spreader pan 500 and/or directly into the grain bin. As more grain is directed to the upper funnel assembly 100, the gap 600 becomes larger. As such, the grain spreader 10 actively responds to the amount of grain directed to the grain spreader 10 to open the gap 600 larger or smaller.

With reference to FIGS. 5 and 6, the choking funnel assembly 300 is in a spring loaded engagement with the upper funnel assembly 100. One or more of the rods 200 may remain in fixed or stationary position, while one or more of the rods 200 may move along with the choking funnel assembly 300. The rods 200 are loaded by springs 250.

As shown in FIGS. 5 and 6, a rod 200a is fixed to the fixed ring 150. The upper end 205 of the rod 200a is in a bearing engagement with the opening 125 of the guide ring 120. The lower end 210 of the rod 200a passes through the opening 158 of the fixed ring 150, and the lower end 210 of the rod 200a is fastened to the fixed ring 150 at the lower surface 167 via nuts 209. As such, the guide ring 120 moves relative to the rod 200a, i.e., the openings 125 of the guide ring 120 move down a length 207 of the rod 200a.

As shown in FIGS. 5 and 6, a rod 200b moves relative to the fixed ring 150. The upper end 205 of the rod 200b is fixed to the guide ring 120, while a length 207 of the rod 200b is free to move through the opening 158 of the fixed ring 150. And, the lower end 210 of the rod 200b is fixed to the openings 340 of the choking funnel mount 330 via the nut 209.

The grain spreader 10 may include a plurality of the rods 200. Although six rods 200 are shown in the FIGS., other versions of the grain spreader 10 may include fewer or additional rods 200. The rod guides 129 may include a low friction surface or be formed from a low friction material such as UHMW (ultra high molecular weight polyethylene material). The rod guides 129 and 165 provide a bearing surface between the rods 200 and the openings 125 and 158.

The springs 250 may include any of a variety of springing or elastic materials that provide sufficient compression and elasticity. One suitable spring 250 is a 6 inch compression springs having a spring constant rate of approximately 3.5 lbs/inch.

The upper funnel 110 and the choking funnel 310 may have a combined volume of approximately 0.5 bushels to approximately 3.0 bushels. The version of the upper funnel 110 and the choking funnel 310 shown in the FIGS. has a volume of approximately 1.75 bushels. The volume of the upper funnel 110 and the choking funnel 310 may be scaled up or down depending upon the application of the grain spreader 10.

The rods 200 may have a length of approximately 6 inches to approximately 24 inches. The rods 200 may provide 3 to approximately 12 inches of opening depth to the gap 600. The rods 200 may be formed from an approximately ½ inch round bar stock or other suitable material. The upper end 205 and the lower end 210 of the rods 200 may include threading to receive the nuts 209. In other aspects, other fasteners may be used to attach the rod to the fixed ring 150 and to the openings 340 of the choking funnel mount 330.

The upper funnel 110 may be formed from galvanized sheet metal. The upper funnel 110 may include a top opening 103 of approximately 21 inches and a bottom opening 107 of approximately 14 inches. The relative size of the top opening 103 and the bottom opening 107 may be scaled up or down depending upon the application for the particular grain bin. The choking funnel 310 may be formed from approximately ⅛ inch thick UHMW (ultra high molecular weight polyethylene material). Of course, the width of the choking funnel 310 may be scaled up or down depending upon the application of the grain spreader 10 and the specific materials used.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

The invention claimed is:

1. A grain spreader with an active choking funnel, comprising:
   an upper funnel assembly to receive grain;
   a choking funnel assembly in a spring loaded engagement with the upper funnel assembly, wherein the upper funnel assembly directs the grain to an upper opening of the choking funnel assembly; and,
   a spreader pan or a grain distributor, wherein the choking funnel assembly spreads the grain on the spreader pan or the grain distributor.

2. The grain spreader according to claim 1, wherein the spring loaded engagement of the choking funnel actively responds to variations of a flow of the grain into the upper funnel assembly.

3. The grain spreader according to claim 1, wherein the spring loaded engagement provides for the choking funnel assembly to descend or lower from the upper funnel assembly in response to a weight or flow rate of the grain received in the upper funnel.

4. The grain spreader according to claim 1, the upper funnel assembly includes an upper funnel comprising a top opening and a bottom opening; the choking funnel assembly includes a choking funnel comprising a conical shape and the upper opening; and wherein the upper opening of the choking funnel is facing upward toward the bottom opening of the upper funnel.

5. The grain spreader according to claim 1, wherein the upper funnel assembly includes an upper funnel comprising a conical shape with a top opening and a bottom opening, wherein the bottom opening is smaller than the top opening; the choking funnel assembly comprising a conical shaped choking funnel with the upper opening; wherein the upper opening is positioned on a wider side of the choking funnel, and wherein the upper opening of the choking funnel is facing upward toward the bottom opening of the upper funnel.

6. The grain spreader according to claim 5, wherein the choking funnel assembly comprise sidewalls and an upper surface that form a concave or cup-like structure to catch or receive the grain.

7. The grain spreader according to claim 1, wherein the upper funnel assembly comprises an upper funnel, and a fixed ring is positioned around the upper funnel in a stationary engagement, wherein the upper funnel assembly further comprises a guide ring positioned around the upper funnel in a moving engagement.

8. The grain spreader according to claim 7, wherein the guide ring moves relative to the upper funnel as the choking funnel assembly moves to and from open and closed positions.

9. The grain spreader according to claim 7, wherein the fixed ring includes a plurality of openings that receive rods, wherein the rods direct or control the movement of the choking funnel assembly.

10. The grain spreader according to claim 7, wherein the grain spreader comprises one or more rods that are fixed to the fixed ring, an upper end of the rod is in a bearing engagement with an opening in the guide ring, and a lower end of the rod passes through an opening of the fixed ring, and the lower end of the rod is fastened to the fixed ring, and the guide ring moves relative to the rod.

11. The grain spreader according to claim 10, wherein the openings of the guide ring move up and down a length of the rod.

12. The grain spreader according to claim 7, wherein the grain spreader comprises one or more rods that moves relative to the fixed ring, an upper end of the rod is fixed to the guide ring, while a length of the rod is free to move through an opening of the guide ring, and a lower end of the rod is fixed to openings of a choking funnel mount.

13. The grain spreader according to claim 1, wherein the upper funnel assembly comprises an upper funnel, and a fixed ring is positioned on the upper funnel in a stationary engagement, wherein the upper funnel assembly further comprises a guide ring positioned on the upper funnel in a moving engagement, wherein one or more spring loaded rods are fixed to the fixed ring, and wherein one or more rods move relative to the fixed ring.

14. The grain spreader according to claim 1, the upper funnel assembly and the choking funnel assembly are engaged together by rods that are engaged with springs, and the weight of grain entering the upper funnel assembly compresses the springs to cause the choking funnel assembly to open.

15. The grain spreader according to claim 1, the upper funnel assembly and the choking funnel assembly are engaged together by a force of spring loaded rods, and grain entering the upper funnel assembly overcomes the force of the spring loaded rods to cause the choking funnel assembly to lower or descend.

16. The grain spreader according to claim 1, an upper funnel is positioned above the choking funnel assembly, wherein the upper funnel assembly directs the grain to the choking funnel assembly, and a weight of the grain causes the choking funnel assembly to lower from the upper funnel to open a bottom opening of a funnel of the upper funnel assembly.

17. A method for spreading grain in grain bin, comprising:
  providing grain spreader with an active choking funnel, comprising: an upper funnel assembly having an upper funnel to receive grain; a choking funnel assembly in a spring loaded engagement with the upper funnel assembly, wherein the upper funnel assembly directs the grain to the choking funnel assembly; and, a spreader pan or a grain distributor, wherein the choking funnel assembly spreads the grain on the spreader pan or the grain distributor;
  positioning the grain spreader in a grain bin;
  directing the grain into an upper opening of the upper funnel;
  directing the grain to the choking funnel assembly;
  causing the choking funnel assembly to lower; and,
  directing the grain to the spreader pan or the grain distributor.

* * * * *